(12) United States Patent
Lernoux et al.

(10) Patent No.: US 10,308,736 B2
(45) Date of Patent: Jun. 4, 2019

(54) POLYETHYLENE POLYMERS AND ARTICLES MADE THEREFROM

(71) Applicant: ExxonMobil Chemical Patents Inc., Baytown, TX (US)

(72) Inventors: Etienne R. H. Lernoux, Grez-Doiceau (BE); Wen Li, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/228,343

(22) Filed: Aug. 4, 2016

(65) Prior Publication Data

US 2017/0081437 A1 Mar. 23, 2017

Related U.S. Application Data

(60) Provisional application No. 62/219,846, filed on Sep. 17, 2015.

(30) Foreign Application Priority Data

Dec. 10, 2015 (EP) ..................................... 15199418

(51) Int. Cl.
| | | |
|---|---|---|
| *C08F 110/02* | (2006.01) | |
| *C08J 5/18* | (2006.01) | |
| *C08F 210/16* | (2006.01) | |

(52) U.S. Cl.
CPC .......... *C08F 110/02* (2013.01); *C08F 210/16* (2013.01); *C08J 5/18* (2013.01); *C08J 2323/06* (2013.01); *C08J 2323/08* (2013.01)

(58) Field of Classification Search
CPC ......... C08F 110/02; C08J 5/18; C08J 2323/06
See application file for complete search history.

(56) References Cited

U.S. PATENT DOCUMENTS

| | | | |
|---|---|---|---|
| 5,278,272 A * | 1/1994 | Lai .................. | B29C 47/0004 526/348 |
| 5,798,427 A | 8/1998 | Foster et al. | |
| 5,879,768 A † | 3/1999 | Falla | |
| 5,972,444 A † | 10/1999 | Patel | |
| 6,255,426 B1 | 7/2001 | Lue et al. | |
| 6,448,341 B1 † | 9/2002 | Kolthammer | |
| 6,982,311 B2 † | 1/2006 | Karande | |
| 7,220,801 B2 * | 5/2007 | Dunaway .............. | B32B 27/32 264/166 |
| 7,951,873 B2 | 5/2011 | Best et al. | |

FOREIGN PATENT DOCUMENTS

| | | | |
|---|---|---|---|
| WO | WO 02/055569 | 7/2002 | |
| WO | WO 2004/022634 | 3/2004 | |
| WO | WO 2004/022646 | 3/2004 | |
| WO | 2014/058660 A | 4/2014 | |
| WO | WO 2014/058657 | 4/2014 | |
| WO | WO 2014/058660 A1 * | 4/2014 | ............. C08L 23/08 |
| WO | WO 2016/081065 | 5/2016 | |

OTHER PUBLICATIONS

Garcia-Franco et. al., "Relative quantification of long chain branching in essentially linear polyethylenes", European Polymer Journal, pp. 376-391, Nov. 17, 2007.†

Doerpinghaus et. al., "Separating the effects of sparse long-chain branching on rheology from those due to molecular weight in polyethylenes", Journal of Rheology, pp. 717-736, 2003.†

Varma-Nair et al., "Structure-Property Relationships in Metallocene Based Ethylene-Octene Plastomers", Society of Plastics Engineers, pp. 2178-2185, 2004.†

\* cited by examiner
† cited by third party

*Primary Examiner* — Robert D. Harlan

(57) ABSTRACT

Metallocene-catalyzed polyethylene polymers and articles made therefrom are provided.

25 Claims, No Drawings

POLYETHYLENE POLYMERS AND ARTICLES MADE THEREFROM

PRIORITY

This application claims priority to and the benefit of U.S. Ser. No. 62/219,846, filed Sep. 17, 2015, and EP 15199418.3, filed Dec. 10, 2015, all of which are hereby incorporated by reference in their entireties.

FIELD OF THE INVENTION

The present invention generally relates to metallocene-catalyzed polyethylene polymers and articles made therefrom.

BACKGROUND OF THE INVENTION

Polyethylene polymers, their blends and articles made therefrom are generally known in the art. Such polymers have typically been made from ethylene and a $C_3$-$C_6$ α-olefin comonomer with a variety of catalysts systems using Ziegler-Natta catalysts, chrome catalysts, metallocene catalysts, constrained-geometry catalysts, etc. in a variety of platforms including gas-phase processes, solution processes, high pressure tubular processes, slurry processes, etc.

U.S. Pat. No. 6,255,426 describes polymers of ethylene and at least one α-olefin having at least five carbon atoms obtained by a continuous gas phase polymerization process using supported catalyst of an activated molecularly discreet catalyst such as a metallocene. The polymerization process is performed in the substantial absence of an aluminum alkyl-based scavenger, and results in a linear low density polyethylene having a combination of good shear thinning behavior and impact strength.

WO 2004/022646 A1 describes heat shrinkable monolayer and multilayer films having good optical and mechanical properties. The films are formed of a blend of a polyethylene copolymer and a second polymer, such as a low density polyethylene. In particular, monolayer and multilayer shrink films are described that include in at least one layer a metallocene-catalyzed polyethylene resin. Also described are articles wrapped with such films.

WO 2004/022634 A1 describes stretch films having at least one layer formed of or including a polyethylene copolymer having a draw ratio of at least 250%, a tensile stress at the natural draw ratio of at least 22 MPa, and a tensile stress at second yield of at least 12 MPa.

U.S. Pat. No. 7,951,873 discloses, among other things, an ethylene copolymer having: i. a composition distribution breadth index of at least 70%; ii. a melt index $I_{2.16}$ of from about 0.3 to about 2.0 g/10 min; iii. a molecular weight distribution of from about 2.5 to about 5.5; iv. a density of from about 0.915 to about 0.940 g/cm³; and v. a melt index ratio, $I_{21.6}/I_{2.16}$, of from about 25 to about 50.

Of all these polyethylene polymers, a special family of polymers has distinguished itself for its performance and versatility known as ENABLE™ mPE available from ExxonMobil Chemical Company, Houston, Tex. ENABLE™ mPE offers an unprecedented combination of polymer film processing advantages and higher alpha olefin (HAO) performance. A good balance of operational stability, extended output, versatility with HAO performance, and resin sourcing simplicity are among the unique properties of this family of polyethylene polymers. For example, Ser. No. 62/082,896, filed Nov. 21, 2014, discloses ENABLE™ 1602 metallocene polyethylene resin having a melt index ($I_{2.16}$) of 0.2 g/10 min and a density of 0.916 g/cm³ incorporated in a multi-layer film. (See the Examples). Commercial ENABLE™ mPE are available at densities from 0.920-0.935 g/cm³ and melt indexes ($I_{2.16}$) from 0.3-1.0 g/10 min.

Even though these references describe polymers using many of the same monomers, catalysts, and processes, none provides a polymer that may produce a film having a good balance of two or more of high tensile strength, high dart impact, high puncture resistance, and low seal initiation temperature.

SUMMARY OF THE INVENTION

In a class of embodiments, the invention provides for a polyethylene polymer comprising at least 65 wt % ethylene derived units, based upon the total weight of the polymer, having: a. a melt index (MI) from about 0.1 g/10 min to about 2.0 g/10 min; b. a density from about 0.910 g/cm³ to about 0.918 g/cm³; c. a melt index ratio (MIR) from about 25 to about 60; and d. a molecular weight ($M_w$) of about 85,000 or greater.

The polyethylene polymer may have a melt index (MI) from about 0.2 g/10 min to about 1.0 g/10 min, from about 0.2 g/10 min to about 0.5 g/10 min, or a melt index (MI) of about 0.2 g/10 min.

The polyethylene polymer may have a density from about 0.910 g/cm³ to about 0.915 g/cm³, a density from about 0.910 g/cm³ to about 0.914 g/cm³ or a density of about 0.913 g/cm³.

The polyethylene polymer may have a melt index ratio (MIR) from about 30 to about 55.

In several classes of embodiments, the polyethylene polymer may exhibit long chain branching.

In any of the previous embodiments, the polyethylene polymer may have a melt strength of about 1 cN to about 25 cN or about 3 cN to about 15 cN.

In any of the previous embodiments, the polyethylene polymer has a $T_{75}$–$T_{25}$ value from 5 to 10, from 5.5 to 10, from 5.5 to 8, from 6 to 10, or from 6 to 8, where $T_{25}$ is the temperature in degrees Celsius at which 25% of the eluted polymer is obtained and $T_{75}$ is the temperature in degrees Celsius at which 75% of the eluted polymer is obtained via temperature rising elution fractionation (TREF).

In another class of embodiments, the invention provides for a film comprising one or more layers, wherein the one or more layers comprise a composition made from the polymer of any one of previous embodiments. The film may be a cast film or an oriented blown film, optionally, biaxially oriented.

Other embodiments are provided in the following disclosure and examples.

DETAILED DESCRIPTION OF ILLUSTRATIVE EMBODIMENTS

Before the present polymers, compounds, components, compositions, and/or methods are disclosed and described, it is to be understood that unless otherwise indicated this invention is not limited to specific polymers, compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Definitions

For the purposes of this disclosure, the following definitions will apply, unless otherwise stated:

Molecular Weight Distribution ("MWD") is equivalent to the expression $M_w/M_n$. The expression $M_w/M_n$ is the ratio of the weight average molecular weight ($M_w$) to the number average molecular weight ($M_n$). The weight average molecular weight is given by $$M_w = \frac{\sum_i n_i M_i^2}{\sum_i n_i M_i}$$

The number average molecular weight is given by:

$$M_n = \frac{\sum_i n_i M_i}{\sum_i n_i}$$

The z-average molecular weight is given by:

$$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in Macromolecules, Vol. 34, No. 19, pg. 6812 (2001). This method is the preferred method of measurement and used in the examples and throughout the disclosures unless otherwise specified.

The broadness of the composition distribution of the polymer may be characterized by $T_{75}-T_{25}$. It is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, Vol. 20, pg. 441 (1982) and U.S. Pat. No. 5,008,204. For example, TREF may be measured using an analytical size TREF instrument (Polymerchar, Spain), with a column of the following dimensions: inner diameter (ID) 7.8 mm, outer diameter (OD) 9.53 mm, and column length of 150 mm. The column may be filled with steel beads. 0.5 mL of a 4 mg/ml polymer solution in orthodichlorobenzene (ODCB) containing 2 g BHT/4 L were charge onto the column and cooled from 140° C. to −15° C. at a constant cooling rate of 1.0° C./min. Subsequently, ODCB may be pumped through the column at a flow rate of 1.0 ml/min, and the column temperature may be increased at a constant heating rate of 2° C./min to elute the polymer. The polymer concentration in the eluted liquid may then be detected by means of measuring the absorption at a wavenumber of 2941 cm$^{-1}$ using an infrared detector. The concentration of the ethylene-α-olefin copolymer in the eluted liquid may be calculated from the absorption and plotted as a function of temperature. As used herein, $T_{75}-T_{25}$ values refer to where $T_{25}$ is the temperature in degrees Celsius at which 25% of the eluted polymer is obtained and $T_{75}$ is the temperature in degrees Celsius at which 75% of the eluted polymer is obtained via a TREF analysis. For example, in an embodiment, the polymer may have a $T_{75}-T_{25}$ value from 5 to 10, alternatively, a $T_{75}-T_{25}$ value from 5.5 to 10, and alternatively, a $T_{75}-T_{25}$ value from 5.5 to 8, alternatively, a $T_{75}-T_{25}$ value from 6 to 10, and alternatively, a $T_{75}-T_{25}$ value from 6 to 8, where $T_{25}$ is the temperature in degrees Celsius at which 25% of the eluted polymer is obtained and $T_{75}$ is the temperature in degrees Celsius at which 75% of the eluted polymer is obtained via temperature rising elution fractionation (TREF).

In another class of embodiments, $T_{75}-T_{25}$ may be defined by the formula: $T_{75}-T_{25}=117.41+28.1*MI-122.5*density-29.3*MI*density$ with a given MI and density.

Additional definitions that will better help the reader understand the claimed invention are provided below.

Polyethylene Polymers

The polyethylene polymers are ethylene-based polymers having about 99.0 to about 80.0 wt %, 99.0 to 85.0 wt %, 99.0 to 87.5 wt %, 99.0 to 90.0 wt %, 99.0 to 92.5 wt %, 99.0 to 95.0 wt %, or 99.0 to 97.0 wt %, of polymer units derived from ethylene and about 1.0 to about 20.0 wt %, 1.0 to 15.0 wt %, 1.0 to 12.5 wt %, 1.0 to 10.0 wt %, 1.0 to 7.5 wt %, 1.0 to 5.0 wt %, or 1.0 to 3.0 wt % of polymer units derived from one or more $C_3$ to $C_{20}$ α-olefin comonomers, preferably $C_3$ to $C_{10}$ α-olefins, and more preferably $C_4$ to $C_8$ α-olefins. The α-olefin comonomer may be linear, branched, cyclic and/or substituted, and two or more comonomers may be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene, and mixtures thereof.

Additionally, polyethylene polymers may have a melt index (MI), $I_{2.16}$ or simply 12 for shorthand according to ASTM D1238, condition E (190° C./2.16 kg) reported in grams per 10 minutes (g/10 min), of ≥about 0.10 g/10 min, e.g., ≥about 0.15 g/10 min, ≥about 0.18 g/10 min, ≥about 0.20 g/10 min, ≥about 0.22 g/10 min, ≥about 0.25 g/10 min, or ≥about 0.28 g/10 min. Additionally, the polyethylene polymers may have a melt index ($I_{2.16}$)≤about 2.0 g/10 min, e.g., ≤about 1.5 g/10 min, ≤about 1.0 g/10 min, ≤about 0.75 g/10 min., ≤about 0.50 g/10 min., ≤about 0.30 g/10 min, ≤about 0.25 g/10 min, ≤about 0.22 g/10 min, ≤about 0.20 g/10 min, ≤about 0.18 g/10 min, or ≤about 0.15 g/10 min. Ranges expressly disclosed include, but are not limited to, ranges formed by combinations any of the above-enumerated values, e.g., from about 0.1 to about 2.0, about 0.2 to about 1.0, about 0.2 to about 0.5 g/10 min, etc.

The polyethylene polymers may also have High Load Melt Index (HLMI), $I_{21.6}$ or I21 for shorthand, measured in accordance with ASTM D-1238, condition F (190° C./21.6 kg). For a given polymer having an MI and MIR as defined herein the HLMI is fixed and can be calculated in accordance with the following paragraph.

The polyethylene polymers may have a Melt Index Ratio (MIR) which is a dimensionless number and is the ratio of the high load melt index to the melt index, or $I_{21.6}/I_{2.16}$ as described above. The MIR of the polyethylene polymers may be from 25 to 60, alternatively, from about 30 to about 55, and alternatively, from about 35 to about 50.

The polyethylene polymers may have a density ≥about 0.910 g/cm³, e.g., ≥about 0.912 g/cm³, ≥about 0.913 g/cm³, ≥about 0.915 g/cm³, ≥about 0.916 g/cm³, ≥about 0.917 g/cm³, ≥about 0.918 g/cm³. Additionally or alternatively, polyethylene polymers may have a density ≤about 0.920 g/cm³, e.g., ≤about 0.918 g/cm³, ≤about 0.917 g/cm³, ≤about 0.916 g/cm³, ≤about 0.915 g/cm³, or ≤about 0.914 g/cm³. Ranges expressly disclosed include, but are not limited to, ranges formed by combinations any of the above-enumerated values, e.g., from about 0.910 to about 0.920 g/cm³, 0.915 to 0.920 g/cm3, 0.914 to 0.918 g/cm3, 0.915 to 0.917 g/cm3, etc. Density is determined using chips cut from plaques compression molded in accordance with ASTM D-1928 Procedure C, aged in accordance with ASTM D-618 Procedure A, and measured as specified by ASTM D-1505.

Typically, although not necessarily, the polyethylene polymers may have a molecular weight distribution (MWD, defined as $M_w/M_n$) of about 2.5 to about 5.5, preferably 4.0 to 5.0.

The melt strength of a polymer at a particular temperature may be determined with a Gottfert Rheotens Melt Strength Apparatus. To determine the melt strength, a polymer melt strand extruded from the capillary die is gripped between two counter-rotating wheels on the apparatus. The take-up speed is increased at a constant acceleration of 2.4 mm/sec². The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The polymer melt is extruded from the die at a speed of 10 mm/sec. The distance between the die exit and the wheel contact point should be 122 mm. The melt strength of polymers of embodiments of invention may be in the range from about 1 to about 100 cN, about 1 to about 50 cN, about 1 to about 25 cN, about 3 to about 15 cN, about 4 to about 12 cN, or about 5 to about 10 cN.

The polyethylene polymers may also be characterized by an averaged 1% secant modulus (M) of from 10,000 to 60,000 psi (pounds per square inch), and a relation between M and the dart drop impact strength in g/mil (DIS) complying with formula (A):

$$DIS \geq 0.8 * [100 + e^{(11.71 - 0.000268M + 2.183 \times 10^{-9} M^2)}], \quad (A)$$

where "e" represents 2.7183, the base Napierian logarithm, M is the averaged modulus in psi, and DIS is the 26 inch dart impact strength. The DIS is preferably from about 120 to about 1000 g/mil, even more preferably, from about 150 to about 800 g/mil.

The relationship of the Dart Impact Strength to the averaged 1% secant modulus is thought to be one indicator of long-chain branching in the ethylene-based polymer. Thus, alternatively ethylene-based polymers of certain embodiments may be characterized as having long-chain branches. Long-chain branches for the purposes of this invention represent the branches formed by reincorporation of vinyl-terminated macromers, not the branches formed by incorporation of the comonomers. The number of carbon atoms on the long-chain branches ranges from a chain length of at least one carbon more than two carbons less than the total number of carbons in the comonomer to several thousands. For example, a long-chain branch of an ethylene/hexene ethylene-based polymer may have chain comprising greater than 6 carbon atoms, greater than 8 carbon atoms, greater than 10 carbon atoms, greater than 12 carbon atoms, etc. and combinations thereof for long-chain branches.

Various methods are known for determining the presence of long-chain branches. For example, long-chain branching may be determined using ¹³C nuclear magnetic resonance (NMR) spectroscopy and to a limited extent; e.g., for ethylene homopolymers and for certain copolymers, and it can be quantified using the method of Randall (*Journal of Macromolecular Science, Rev. Macromol. Chem. Phys., C29* (2&3), p. 285-297). Although conventional ¹³C NMR spectroscopy cannot determine the length of a long-chain branch in excess of about six carbon atoms, there are other known techniques useful for quantifying or determining the presence of long-chain branches in ethylene-based polymers, such as ethylene/1-octene interpolymers. For those ethylene-based polymers wherein the ¹³C resonances of the comonomer overlap completely with the ¹³C resonances of the long-chain branches, either the comonomer or the other monomers (such as ethylene) can be isotopically labeled so that the long-chain branches can be distinguished from the comonomer. For example, a copolymer of ethylene and 1-octene can be prepared using ¹³C-labeled ethylene. In this case, the resonances associated with macromer incorporation will be significantly enhanced in intensity and will show coupling to neighboring ¹³C carbons, whereas the octene resonances will be unenhanced.

Alternatively, the degree of long-chain branching in ethylene-based polymers may be quantified by determination of the branching index. The branching index g' is defined by the following equation:

$$g' = \frac{IV_{Br}}{IV_{Lin}} \bigg|_{M_w}$$

where g' is the branching index, $IV_{Br}$ is the intrinsic viscosity of the branched ethylene-based polymer and $IV_{Lin}$ is the intrinsic viscosity of the corresponding linear ethylene-based polymer having the same weight average molecular weight and molecular weight distribution as the branched ethylene-based polymer, and in the case of copolymers and terpolymers, substantially the same relative molecular proportion or proportions of monomer units. For the purposes, the molecular weight and molecular weight distribution are considered "the same" if the respective values for the branched polymer and the corresponding linear polymer are within 10% of each other. Preferably, the molecular weights are the same and the MWD of the polymers are within 10% of each other. A method for determining intrinsic viscosity of polyethylene is described in *Macromolecules*, 2000, 33, 7489-7499. Intrinsic viscosity may be determined by dissolving the linear and branched polymers in an appropriate solvent, e.g., trichlorobenzene, typically measured at 135° C. Another method for measuring the intrinsic viscosity of a polymer is ASTM D-5225-98—Standard Test Method for Measuring Solution Viscosity of Polymers with a Differential Viscometer, which is incorporated by reference herein in its entirety. This method is the preferred method of measurement and relates to any branching value(s) described herein, including the examples and claims, unless otherwise specified.

The branching index, g' is inversely proportional to the amount of branching. Thus, lower values for g' indicate relatively higher amounts of branching. The amounts of short and long-chain branching each contribute to the branching index according to the formula: $g'=g'_{LCB} \times g'_{SCB}$. Thus, the branching index due to long-chain branching may be calculated from the experimentally determined value for g' as described by Scholte, et al., in *J. App. Polymer Sci.*, 29, pp. 3763-3782 (1984), incorporated herein by reference.

Typically, the polyethylene polymers have a g' vis of 0.85 to 0.99, particularly, 0.87 to 0.97, 0.89 to 0.97, 0.91 to 0.97, or 0.93 to 0.95.

The polyethylene polymers may be made by any suitable polymerization method including solution polymerization, slurry polymerization, gas phase polymerization using supported or unsupported catalyst systems, such as a system incorporating a metallocene catalyst.

As used herein, the term "metallocene catalyst" is defined to comprise at least one transition metal compound containing one or more substituted or unsubstituted cyclopentadienyl moiety (Cp) (typically two Cp moieties) in combination with a Group 4, 5, or 6 transition metal, such as, zirconium, hafnium, and titanium.

Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system may be supported on a carrier, typically an inorganic oxide or chloride or a resinous material such as, for example, polyethylene or silica.

Zirconium transition metal metallocene-type catalyst systems are particularly suitable. Non-limiting examples of metallocene catalysts and catalyst systems useful in practicing the present invention include those described in, U.S. Pat. Nos. 5,466,649; 6,476,171; 6,225,426; and 7,951,873; and in the references cited therein, all of which are fully incorporated herein by reference. Particularly useful catalyst systems include supported dimethylsilyl bis(tetrahydroindenyl) zirconium dichloride.

Supported polymerization catalyst may be deposited on, bonded to, contacted with, or incorporated within, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene may be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane may be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it may be removed under vacuum or by nitrogen purge to afford an active catalyst. The mixing time may be greater than 4 hours, but shorter times are suitable.

Typically in a gas phase polymerization process, a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See e.g., U.S. Pat. Nos. 4,543,399; 4,588,790; 5,028,670; 5,317,036; 5,352,749; 5,405,922; 5,436,304; 5,453,471; 5,462,999; 5,616,661; and 5,668,228 all of which are fully incorporated herein by reference.)

Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. The reactor pressure may vary from 100 psig (680 kPag)-500 psig (3448 kPag), or in the range of from 200 psig (1379 kPag)-400 psig (2759 kPag), or in the range of from 250 psig (1724 kPag)-350 psig (2414 kPag). The reactor may be operated at a temperature in the range of 60° C. to 120° C., 60° C. to 115° C., 70° C. to 110° C., 75° C. to 95° C., or 80° C. to 95° C. The productivity of the catalyst or catalyst system is influenced by the main monomer partial pressure. The mole percent of the main monomer, ethylene, may be from 25.0-90.0 mole percent, or 50.0-90.0 mole percent, or 70.0-85.0 mole percent, and the monomer partial pressure may be in the range of from 75 psia (517 kPa)-300 psia (2069 kPa), or 100-275 psia (689-1894 kPa), or 150-265 psia (1034-1826 kPa), or 200-250 psia (1378-1722 kPa).

To obtain the inventive polymers, individual flow rates of ethylene, comonomer, and hydrogen should be controlled in accordance with the inventive Examples disclosed herein.

Other gas phase processes contemplated by the process of the invention include those described in U.S. Pat. Nos. 5,627,242; 5,665,818; 5,677,375; 6,255,426; and European published patent applications EP-A-0 794 200; EP-A-0 802 202; and EP-B-0 634 421; all of which are herein fully incorporated by reference.

Additionally, the use of a process continuity aid, while not required, may be desirable in any of the foregoing processes. Such continuity aids are well known to persons of skill in the art and include, for example, metal stearates.

Polymer Blends

The polyethylene polymers of the invention may be blended with other polymers, such as polyolefin polymers, including others types of polyethylene polymers, to produce end-use articles, such as, films.

Films

The polyethylene polymers or blends containing those polymers may be fabricated into many types of films. The films may be monolayer or multilayer films. The polyethylene polymers of the invention may comprise one or more layers of the film and be used in combination with other polymers, such as, other polyolefin polymers, functionalized polymers, elastomers, plastomers, etc.

Suitable blown film and cast film process are described in detail in "Plastics Films" by John H. Briston, Longman Scientific and Technical, 1986.

In several classes of embodiments of the invention, if not all, the films made from inventive polymers demonstrate excellent clarity. For example, the clarity of the films may be 70% or greater, 75% or greater, 78% or greater, 79% or greater, or 80% or greater, as measured by ASTM D 1746.

Test Methods

The properties cited below were determined in accordance with the following test procedures. Where any of these properties is referenced in the appended claims, it is to be measured in accordance with the specified test procedure.

Where applicable, the properties and descriptions below are intended to encompass measurements in both the machine and transverse directions. Such measurements are reported separately, with the designation "MD" indicating a measurement in the machine direction, and "TD" indicating a measurement in the transverse direction.

Gauge, reported in mils, was measured using a Measuretech Series 200 instrument. The instrument measures film thickness using a capacitance gauge. For each film sample, ten film thickness datapoints were measured per inch of film as the film was passed through the gauge in a transverse direction. From these measurements, an average gauge measurement was determined and reported.

Elmendorf Tear, reported in grams (g) or grams per mil (g/mil), was measured as specified by ASTM D-1922.

Tensile Strength at Yield, reported in pounds per square inch (lb/in$^2$ or psi), was measured as specified by ASTM D-882.

Tensile Strength at Break, reported in pounds per square inch (lb/in$^2$ or psi), was measured as specified by ASTM D-882.

Elongation at Yield, reported as a percentage (%), was measured as specified by ASTM D-882.

Elongation at Break, reported as a percentage (%), was measured as specified by ASTM D-882.

1% Secant Modulus (M), reported in pounds per square inch (lb/int or psi), was measured as specified by ASTM D-882.

Haze, reported as a percentage (%), was measured as specified by ASTM D-1003.

Clarity, reported as a percentage (%), was measured as specified by ASTM D-1746.

Dart $F_{50}$, or Dart Drop Impact or Dart Drop Impact Strength (DIS), reported in grams (g) and/or grams per mil (g/mil), was measured as specified by ASTM D-1709, method A, unless otherwise specified.

"Puncture Force/Energy"—A probe puncture energy test was completed using an Instron Universal tester that records a continuous reading of the force (stress) and penetration (strain) curve. A 6 inch by 6 inch (15 cm by 15 cm) film specimen was securely mounted to a compression load cell to expose a test area 4 inches in diameter (10 cm). Two HDPE slip sheets each 2 inches by 2 inches (5 cm by 5 cm) and each approximately 0.25 mils (6.35 µm) thick were loosely placed on the test surface. A ¾ inch (1.875 cm) diameter elongated matte finished stainless steel probe, traveling at a constant speed of 10 inch/minute (35 cm/min) was lowered into the film, and a stress/strain curve was recorded and plotted. The "puncture force" was the maximum force (pounds) encountered or pounds per mil (lb/mil) encountered. The machine was used to integrate the area under the stress/strain curve, which is indicative of the energy consumed during the penetration to rupture testing of the film, and is reported as "puncture energy" (inch pounds) and/or inch-pounds per mil (in-lb/mil). The probe penetration distance was not recorded in these tests, unless specifically states to the contrary.

Where any of the above properties are reported in pounds per square inch, grams per mil, or in any other dimensions that are reported per unit area or per unit thickness, the ASTM methods cited for each property have been followed except that the film gauge was measured based on ASTM D-374, method C.

Examples

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

A polymerization reaction was conducted in a continuous gas phase fluidized bed reactor having a straight section of 24 inch (61 cm) diameter with a length of approximately 11.75 feet (3.6 m) and an expanded section of 10.2 feet (3.1 m) length and 4.2 feet (1.3 m) diameter at the largest width. The fluidized bed is made up of polymer granules. The gaseous feed streams of ethylene and hydrogen together with liquid 1-hexene were mixed together in a mixing tee arrangement and introduced below the reactor bed into the recycle gas line. The individual flow rates of ethylene, hydrogen and 1-hexene were controlled to produce the inventive polymers having the novel attributes as claimed. The ethylene concentration was controlled to maintain a constant ethylene partial pressure. The hydrogen was controlled to maintain a constant hydrogen to ethylene mole ratio. The concentrations of all gasses were measured by an on-line gas chromatograph to ensure relatively constant composition in the recycle gas stream.

A solid zirconocene catalyst was prepared with the materials and preparation method as disclosed in U.S. Pat. No. 6,476,171, Col. 7, line 10, bridging Col. 8, line 26 (herein referred to as the "solid catalyst"). The solid catalyst was injected directly into the fluidized bed using purified nitrogen as a carrier. Its rate of injection was adjusted to maintain a constant production rate of the polymer. The reacting bed of growing polymer particles was maintained in a fluidized state by continually flowing the makeup feed and recycle gas through the reaction zone at a superficial gas velocity 1-3 ft/sec (0.3 to 0.9 m/sec). The reactor was operated at a total pressure of 300 psig (2068 kPa gauge). To maintain a constant reactor temperature, the temperature of the recycle gas was continuously adjusted up or down to accommodate any changes in the rate of heat generation due to the polymerization.

The fluidized bed was maintained at a constant height by withdrawing a portion of the bed at a rate equal to the rate of formation of particulate product. The product was removed semi-continuously via a series of valves into a fixed volume chamber which was simultaneously vented back to the reactor to allow highly efficient removal of the product, while at the same time recycling a large portion of the unreacted gases back to the reactor. This product was purged to remove entrained hydrocarbons and treated with a small stream of humidified nitrogen to deactivate any trace quantities of residual catalyst and cocatalyst. The reaction conditions for the polymerizations are shown in Table 1. Polymer properties and characterization data may be found in Table 1.

TABLE 1

| Polymerization Conditions | | | |
|---|---|---|---|
| | 1 | 2 | 3 |
| C2 Concentration (mole %) | 60.1 | 60.0 | 59.9 |
| H2 Concentration (ppm) | 721 | 600 | 629 |
| Hexene concentration (mole %) | 0.51 | 0.51 | 0.56 |
| Reactor Pressure (bar) | 21.6 | 21.6 | 21.6 |
| Temperature (deg C.) | 84 | 84 | 81 |
| Bed Weight (Kg) | 333 | 331 | 334 |
| Production Rate (Kg PE/hr) | 74.9 | 68.8 | 71.9 |
| Cat Activity (Kg PE/kg Cat) | 6064 | 5569 | 5031 |
| Bulk Density (gm/ml) | 0.47 | 0.45 | 0.45 |
| Melt Index (I2) | 0.43 | 0.20 | 0.19 |
| HLMI (I21) | 18.5 | 10.5 | 9.4 |
| MFR (I21/I2) | 43.5 | 51.2 | 49.1 |
| Density (gm/ml) | 0.917 | 0.915 | 0.911 |

Additional inventive polymers, examples 4-8, were produced under similar polymerization conditions described in Table 1 and their properties and characterization data are provided in Table 2. Those skilled in the art will recognize that process conditions, such as, individual flow rates of ethylene, hydrogen, and comonomer concentration may be routinely altered to produce variations in polymers attributes.

As shown in Table 2, inventive samples have distinctly high MIRs from References 1-3. Composition distributions of inventive examples are significantly narrower than References examples 1-3 as shown in lower $T_{75}$–$T_{25}$ values. Branching indexes (g') of the inventive examples are in the

TABLE 2

Polymer Characterization

|  | 4 | 5 | 6 | 7 | 8 | Reference 1 | Reference 2 | Reference 3 | Reference 4 |
|---|---|---|---|---|---|---|---|---|---|
| Density | 0.916 | 0.916 | 0.917 | 0.913 | 0.913 | 0.913 | 0.914 | 0.914 | 0.921 |
| MI | 0.25 | 0.53 | 0.94 | 0.18 | 0.44 | 0.97 | 1.01 | 0.86 | 0.47 |
| MIR | 51.3 | 41.0 | 35.0 | 49.1 | 39.1 | 17.5 | 16.3 | 31.1 | 46.8 |
| DSC 2nd melt |  |  |  |  |  |  |  |  |  |
| Tm1 | 106.7 | 105.3 | 105.3 | 102.5 | 100.8 | 75.0 | 100.4 | 102.5 | 110.3 |
| Tm2 | 115.1 | 114.1 | 113.7 | 113.6 | 112.0 | 99.7 | 112.7 | 118.5 | 116.2 |
| Tm3 |  | 117.5 | 117.5 | 117.0 | 116.2 | 111.1 | 115.3 | 122.2 |  |
| GPC (DRI Detector) |  |  |  |  |  |  |  |  |  |
| Mn | 37170 | 32787 | 29498 | 38345 | 33797 | 45185 | 53003 | 30283 | 32213 |
| Mw | 127848 | 108333 | 99203 | 139205 | 115981 | 124753 | 123616 | 127933 | 112524 |
| Mz | 257800 | 210560 | 201875 | 274045 | 223649 | 231246 | 227925 | 382951 | 243260 |
| Mw/Mn | 3.4 | 3.3 | 3.4 | 3.6 | 3.4 | 2.8 | 2.3 | 4.2 | 3.5 |
| Branching Index g' | 0.988 | 0.988 | 0.982 | 0.992 | 0.987 | 0.998 | 1.000 | 1.000 | 0.975 |
| Mole % Hexene | 3.0 | 5.4 | 3.7 | 3.9 | 3.9 | 4.1 | 3.7 | 4.8 | 2.8 |
| Wt % Hexene | 8.4 | 9.5 | 10.2 | 11.6 | 10.9 | 11.5 | 10.2 | 9.2 | 8.0 |
| SCB/1000 Carbons | 14.3 | 15.9 | 17.0 | 19.4 | 18.2 | 19.1 | 17.0 | 21.2 | 13.3 |
| Melt strength (cN) | 7.3 | 4.3 | 3.0 | 10.4 | 5.8 | — | — | — | 4.8 |
| $T_{75}$–$T_{25}$ | 5.4 | 5.8 | 6.3 | 5.6 | 6.4 | 20.4 | 11.6 | 20.4 | 5.1 |

Examples of inventive polyethylene polymers were processed into blown films on a blown film line having 2 1/2 inch (80 mm) extruder with 30 L/D ratio LLDPE screw, 6 inch (15.2 cm) diameter die, 30 mil (0.76 mm) die gap, and dual lip air ring with chilled air at round 60° F. For the examples reported in Table 3, the film line was operated at nominal 188 lbs (85 kg) per hour with 29 inch (74 cm) frost line height and 2.5 blow up ratio (BUR) producing nominal 1.0 mil (0.25 mm) films for the resins.

Also included in Table 2 and Table 3 are comparative or reference examples 1-4. Reference 1 is Evolue™ SP1510 commercially available from Prime Polymer Co., Ltd. Reference 2 is mPact™ D163 commercially available from Chevron Phillips Chemical Company. Reference 3 is SCLAIR™ FP112-A commercially available from Nova Chemical. Reference 4 is Enable™ mPE 20-05HH, a commercial mLLDPE available from ExxonMobil Chemical Company.

range of 0.982-0.992, suggesting the presence of long chain branching. No long chain branching is detected in Reference examples 1-3.

Additionally, the films of inventive examples 4, 5, 7, and 8 show a good balance of high tensile strength, high dart impact, high puncture resistance, and low seal initiation temperature (SIT) relative to Reference examples 1-4.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may

TABLE 3

|  | 4 | 5 | 6 | 7 | 8 | Reference 1 | Reference 2 | Reference 3 | Reference 4 |
|---|---|---|---|---|---|---|---|---|---|
| Tensile at Yield, MD (psi) | 1,206 | 1,179 | 1,190 | 1,027 | 1,038 | 988 | 1,040 | 1,080 | 1,442 |
| Tensile at Yield, TD (psi) | 1,272 | 1,229 | 1,240 | 1,078 | 1,006 | 945 | 1,013 | 1,015 | 1,561 |
| Tensile Strength, MD (psi) | 10,753 | 9,315 | 8,827 | 10,749 | 10,196 | 7,341 | 10,124 | 7,496 | 9,205 |
| Tensile Strength, TD (psi) | 9,158 | 8,712 | 8,183 | 10,407 | 9,296 | 7,894 | 9,476 | 8,309 | 7,837 |
| Dart (g/mil) | 1222 | 875 | 719 | 1300 | 1300 | 1300 | 1300 | 740 | 388 |
| Puncture Peak Force (lbs/mil) | 13.2 | 12.3 | 11.3 | 15.8 | 13.9 | 11.5 | 12.2 | 11.8 | 11.6 |
| Puncture Break Energy (in-lbs/mil) | 37.7 | 35.4 | 34.0 | 43.7 | 42.5 | 40.1 | 37.4 | 39.9 | 32.3 |
| 1% Secant Modulus, MD (kpsi) | 23.9 | 22.5 | 22.8 | 19.0 | 17.5 | 16.5 | 18.4 | 18.1 | 29.5 |
| 1% Secant Modulus, TD (kpsi) | 28.3 | 27.1 | 26.2 | 23.5 | 20.5 | 20.0 | 21.0 | 21.4 | 34.9 |
| Tear MD g/mil | 70 | 105 | 158 | 51 | 95 | 185 | 173 | 256 | 91 |
| Tear TD (g/mil) | 390 | 414 | 430 | 312 | 370 | 321 | 334 | 620 | 500 |
| Haze | 8.7 | 7.5 | 8.7 | 9.2 | 6.6 | 29.9 | 4.5 | 6.0 | 9.8 |
| Clarity | 78 | 79 | — | 77 | — | — | — | — | 77 |
| SIT @ 1 lbs (° C.) | 98.4 | 97.2 | 96.5 | 93.7 | 91.3 | 87.4 | 89.6 | 88.9 | 106.8 |
| Seal Plateau Strength (lbs) | 3.6 | 2.9 | 2.9 | 3.8 | 2.9 | 2.3 | 2.8 | 2.6 | 3.1 | be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A polyethylene polymer comprising at least 65 wt % ethylene derived units, based upon the total weight of the polymer, the polymer having:
   a melt index (MI) from about 0.1 g/10 min to about 2.0 g/10 min;
   a density from about 0.910 g/cm3 to about 0.918 g/cm3;
   a melt index ratio (MIR) from about 35 to about 55;
   a molecular weight (Mw) of about 85,000 or greater; and
   a molecular weight distribution (Mw/Mn) of about 2.5 to about 5.5.

2. The polymer of claim 1, wherein the polymer has a melt index (MI) from about 0.2 g/10 min to about 1.0 g/10 min.

3. The polymer of claim 1, wherein the polymer has a melt index (MI) from about 0.2 g/10 min to about 0.5 g/10 min.

4. The polymer of claim 1, wherein the polymer has a melt index (MI) of about 0.2 g/10 min.

5. The polymer of claim 1, wherein the polymer has a density from about 0.910 g/cm3 to about 0.915 g/cm3.

6. The polymer of claim 1, wherein the polymer has a density from about 0.910 g/cm3 to about 0.914 g/cm3.

7. The polymer of claim 1, wherein the polymer has a density of about 0.913 g/cm3.

8. The polymer of claim 1, wherein the polymer has a melt index ratio (MIR) from 35 to about 55.

9. The polymer of claim 1, wherein the polymer has a melt index ratio (MIR) from about 35 to about 50.

10. The polymer of claim 1, wherein the polymer exhibits long chain branching.

11. The polymer of claim 1, wherein the polymer has a g' branching index from about 0.97 to about 0.99.

12. The polymer of claim 1, wherein the polymer has a g' branching index from about 0.95 to about 0.98.

13. The polymer of claim 1, wherein the polymer has a molecular weight (Mw) of about 100,000 or greater.

14. The polymer of claim 1, wherein the polymer has a molecular weight (Mw) of about 110,000 or greater.

15. The polymer of claim 1, wherein the polymer has a melt strength of about 1 cN to about 25 cN.

16. The polymer of claim 1, wherein the polymer has a melt strength of about 3 cN to about 15 cN.

17. The polymer of claim 1, wherein the polymer has a T75–T25 value from 5.0 to 10, where T25 is the temperature in degrees Celsius at which 25% of the eluted polymer is obtained and T75 is the temperature in degrees Celsius at which 75% of the eluted polymer is obtained via temperature rising elution fractionation (TREF).

18. The polymer of claim 1, wherein the polymer has a T75–T25 value from 5.5 to 10, where T25 is the temperature in degrees Celsius at which 25% of the eluted polymer is obtained and T75 is the temperature in degrees Celsius at which 75% of the eluted polymer is obtained via temperature rising elution fractionation (TREF).

19. The polymer of claim 1, wherein the polymer has a T75-T25 value from 5.5 to 8, where T25 is the temperature in degrees Celsius at which 25% of the eluted polymer is obtained and T75 is the temperature in degrees Celsius at which 75% of the eluted polymer is obtained via temperature rising elution fractionation (TREF).

20. The polymer of claim 1, wherein the polymer comprises from about 8 wt % to about 15 wt %, of C3-C10 α-olefin derived units, and from about 92 wt % to about 85 wt % ethylene derived units, based upon the total weight of the polymer.

21. The polymer of claim 1, wherein the polymer comprises from about 9 wt % to about 12 wt %, of C3-C10 α-olefin derived units, and from about 91 wt % to about 88 wt % ethylene derived units, based upon the total weight of the polymer.

22. A blend comprising the polymer of claim 1.

23. A film comprising one or more layers, wherein the one or more layers comprise a composition made from the polymer of claim 1.

24. The film of claim 23, wherein the film is a cast film or the film is an oriented blown film, optionally, biaxially oriented.

25. The film of claim 24, wherein the film has a clarity of 75% or greater as measured by ASTM D 1746.

* * * * *